3,118,874
PROCESS FOR PREPARING CRYSTALLINE
MONOSODIUM NOVOBIOCIN
Alma Dietz, Kalamazoo, Clarence De Boer, Kalamazoo Township, Kalamazoo County, Charles G. Smith, Malcolm E. Bergy and Herman Hoeksema, Kalamazoo, Mich., assignors to The Upjohn Company, Kalamazoo, Mich., a corporation of Delaware
No Drawing. Filed Oct. 30, 1961, Ser. No. 148,726
14 Claims. (Cl. 260—210)

This invention pertains to an improved process for preparing crystalline monosodium novobiocin. More particularly, the invention is directed to the process which comprises neutralizing novobiocin in a reaction medium of methyl ethyl ketone and water to produce monosodium novobiocin, and then crystallizing the thus-produced monosodium novobiocin and recovering it in crystalline form.

This application is a continuation-in-part of pending application Serial No. 602,814, filed August 8, 1956 (now abandoned), which application was in turn a continuation-in-part of application Serial No. 557,965, filed January 9, 1956 (now abandoned).

Novobiocin (formerly called streptonivicin) is a known antibiotic, and its monosodium salt is a particularly efficacious and commercially useful form because it can be administered orally. The antibiotic is active against streptococci, pneumococci, and penicillin-resistant straphylococci; and it can be administered alone or in combination with, for example, a sulfonamide (e.g., sulfadiazine), or another antibiotic (e.g., tetracycline) for control of bacterial infections of the skin, respiratory tract, genitourinary tract, blood stream, bones, connecting tissues, and other tissues.

In the preparation of monosodium novobiocin methyl ethyl ketone appeared to be a particularly suitable medium because novobiocin is soluble therein (about 150 to 200 mg. per ml.) while monosodium novobiocin is insoluble therein (less than 1 mg. per ml.). From these solubility relationships, one might expect to prepare monosodium novobiocin by uncomplicated neutralization of novobiocin in methyl ethyl ketone to precipitate the monosodium salt. From a practical standpoint, however, such a method is not satisfactory, because the preferred neutralizing reagents are relatively insoluble in pure methyl ethyl ketone, and precipitation of the monosodium novobiocin in the presence of undissolved neutralizing reagent results in an amorphous and more or less contaminated product.

It has now been found in accordance with the process of the invention that neutralization of novobiocin (in methyl ethyl ketone) to monosodium novobiocin can be readily accomplished by including a minor proportion of water in the reaction mixture. Further, it has been found that the monosodium novobiocin is soluble in a mixture of methyl ethyl ketone and water having at least about 4% water or more. Likewise, it has been found that monosodium novobiocin can be obtained in crystalline form from aqueous methyl ethyl ketone solutions by reducing the concentration of water and thus reducing solubility therein of the monosodium novobiocin.

For example, it has been found that a reaction medium of about 12% water and 88% (volume:volume) methyl ethyl ketone retains as much as 350 mg. per ml. of monosodium novobiocin in solution. Likewise, a reaction medium having 29% water retains as much as 450 mg. per ml. of monosodium novobiocin in solution. Moreover, the monosodium novobiocin enhances the miscibility of the methyl ethyl ketone and water so that homogeneous solutions are obtained at relatively high concentrations of water and monosodium novobiocin.

In general, the neutralization step of the process of the invention can be carried out with mixtures of methyl ethyl ketone and water ranging from about 2% to about 40% water. For example, novobiocin dissolved in methyl ethyl ketone containing about 4% water can be neutralized with one equivalent of sodium hydroxide and the monosodium novobiocin can be recovered in crystalline form directly from the reaction mixture. Under these conditions the neutralization proceeds at a satisfactory rate, but the alkali must be added slowly with vigorous agitation in order to prevent localized heating of the mixture and degradation of the novobiocin. In a preferred embodiment of the invention, concentrations of water ranging from about 10% to about 40% are used, and the neutralization is effected with sodium salts of acids having a dissociation constant less than that of novobiocin. Illustratively, suitable sodium salts include sodium carbonate, sodium bicarbonate, sodium acetate, sodium propionate, sodium butyrate, sodium 2-ethylhexoate, sodium methoxide, sodium ethoxide, and the like.

When sodium salts such as sodium carbonate or sodium bicarbonate are used, the higher proportions (i.e., about 25% to about 40%) of water are used. Any excess sodium carbonate or sodium bicarbonate can be readily separated from the solution of monosodium novobiocin after neutralization is completed by filtration. In general, a substantially sodium bicarbonate free solution can be obtained by reducing the concentration of water by adding methyl ethyl ketone until the mixture is about 12% water. Excess sodium bicarbonate is precipitated at this concentration of water and can be removed by filtration.

The neutralization reaction may be carried out at any temperature between about $-10°$ C. and about $+70°$ C. Illustratively, neutralization with concentrated (from about 5 normal to 19 normal) sodium hydroxide in methyl ethyl ketone containing a minimal amount (e.g., about 4%) of water is preferably carried out at low temperatures (i.e., $-10°$ to about $25°$ C., preferably, $0°$ to $20°$ C.) to avoid localized heating of the mixture and degradation of the novobiocin. On the other hand, neutralizations with sodium carbonate or sodium bicarbonate are preferably carried out at temperatures of from about $40°$ to about $70°$ C. Under these conditions, neutralizations are accomplished within a period of up to 1 to 2 hrs. or less.

After the neutralization reaction is completed, excess neutralizing reagent has been removed, and the monosodium novobiocin is in solution in the reaction medium; precipitation and crystallization of the monosodium novobiocin is accomplished by decreasing the concentration of water. Advantageously, a highly concentrated solution of monosodium novobiocin in methyl ethyl ketone containing water can be diluted with additional methyl ethyl ketone during crystallization so that the suspension of crystals does not cake or become so viscous as to be difficult to stir or transfer to a filter. Usually, efficient crystallization is effected by increasing the proportion of methyl ethyl ketone to about 98% at which point monosodium novobiocin is soluble only to the extent of about 2 mg. per ml.

Crystallization of monosodium novobiocin by reduction of the concentration of water can also be accomplished by azeotropic distillation. Azeotropic distillation is advantageously carried out under reduced pressure so that the temperature does not exceed about $70°$ C. Depending upon the concentration of monosodium novobiocin in the solution, it might be necessary to add pure methyl ethyl ketone as the azeotropic mixture is withdrawn in order to maintain a fluid consistency for filtration, and recovery.

The crystallization of monosodium novobiocin from solution can be carried out at temperatures ranging from about 0° C. to 60° C. It is preferred, however, that the bulk of the crystallization be carried out at the higher temperatures (e.g., in the range of 40° to 60° C.). Final crystallization is accomplished at lower temperatures (e.g., 0° to 20° C.) in order to obtain maximum yields.

When crystallization is completed, the crystalline monosodium novobiocin is recovered by a conventional method such as filtration. The crystals are further purified by washing and drying.

The following examples are illustrative of the process and products of the present invention, but are not to be construed as limiting.

*Example 1*

25 grams (40.5 millimoles) of novobiocin was dissolved in 167 milliliters of methyl ethyl ketone. The solution was placed in a 250-milliliter three-neck flask and 2.7 milliliters of water was added. A total of 2.13 milliliters of 19 N sodium hydroxide was added to the violently agitated solution over a period of thirty minutes. The resulting mixture was maintained at a temperature between fifty and sixty degrees centigrade during the addition of the alkali; this mixture was maintained at this temperature for an additional 45 minutes accompanied by agitation. The temperature of the mixture was then allowed to drop to about forty degrees centigrade, and at this temperature the mixture was stirred for about one hour. The crystalline monosodium novobiocin thus obtained was filtered and air dried for about one hour and was then vacuum dried at room temperature overnight. There was obtained 23.94 grams of crystalline material assaying 940 to 950 micrograms per milligram and characterized as follows: an ultraviolet adsorption maxima of 304 mu $$E_{1\ cm.}^{1\%} = 345$$

exhibiting absorption bands in the infrared (mineral oil suspension) at the following frequencies (expressed in reciprocal centimeters): 3480, 3340, 1715, 1705, 1655, 1630, 1600, 1522, 1498, 1426, 1370, 1327, 1270, 1215, 1165, 1134, 1115, 1085, 1020, 996, 969, 950, 890, 817, 785, 771, 739 and 715.

*Example 2*

Fifteen g. (24.3 millimoles) of novobiocin was dissolved in 100 ml. of methyl ethyl ketone at 70° C. To this solution was added 3.84 ml. of a sodium carbonate solution prepared by dissolving 320 g. of sodium carbonate in 1 l. of water (the total amount of sodium carbonate added was about 0.95 equivalent of the novobiocin acid). The reaction mixture was vigorously agitated while the temperature was maintained at 60° to 70° C. for 2½ hrs. The monosodium novobiocin crystals that formed were filtered while hot and washed with 50 ml. of methyl ethyl ketone and dried. The yield was 13.79 g. (92%), assaying 936 mcgs. per mg. against *S. lutea*.

*Example 3*

Fifteen g. (24.3 millimoles) of novobiocin was dissolved in 75 ml. of methyl ethyl ketone at 70° C. To this solution was added 4.5 ml. of aqueous sodium carbonate prepared by dissolving 320 g. of sodium carbonate in 1 l. of water. The total amount of sodium carbonate added was 1.12 equivalents. After stirring for 10 min. at 70° C., 125 ml. of methyl ethyl ketone was added. The reaction flask was fitted with a reflux condenser and vacuum was applied intermittently throughout the course of neutralization. The reaction mixture was stirred at 70° C. for 4½ hrs. The monosodium novobiocin crystals were filtered while hot and washed with 50 ml. of methyl ethyl ketone. The yield was 14.64 g. (97.6%); assaying 891 mcgs. per mg. by *S. lutea* and 1168 mcgs. per mg. by U.V.

*Example 4*

Ten kg. (16.3 moles) of crystalline acid novobiocin was suspended in 15 l. of methyl ethyl ketone. The suspension was heated to 50° C., and 1688 g. of anhydrous sodium carbonate was added with stirring. Six l. of deionized water was added, and stirring was continued for about ½ hr. The reaction mixture was then diluted with 27 l. of methyl ethyl ketone over a period of 5 min. during which the temperature dropped to about 40° C. The mixture was reheated to 54° C., and, after stirring for 30 min., the mixture was filtered. The filter cake was washed with a solution of 500 ml. of water in 5500 ml. of methyl ethyl ketone and the washings were added to the filtrate. The solution was diluted over a period of about 15 min. with 96 l. of methyl ethyl ketone that had been heated to 60° C. The temperature dropped to 42° C. Stirring was continued for 40 min., and the viscous solution was heated to 54° C. After stirring for another 10 min., crystallization began. While crystallization proceeded, 176 l. of methyl ethyl ketone, that had been heated to 50° C., was added at the rate of 3½ l. per min. The crystallizing mixture was held at 50° to 54° C. for 1 hr. with constant stirring. The suspension of crystals was cooled to 28° C. and filtered. The crystals were slurried in 15 l. of a solution of 98% methyl ethyl ketone and 2% water and the suspension was filtered. The filter cake was washed with 5 l. of the 98% methyl ethyl ketone and 2% water, and then washed with 10 l. of methyl ethyl ketone. The crystals of monosodium novobiocin thus obtained were dried for 48 hrs. at 90° F. and 0.3 mm. of mercury pressure. There was thus obtained 8.97 kg. of monosodium novobiocin which had an activity of 885 mcg./mg. when assayed with *S. lutea*.

*Example 5*

Twenty g. (32.4 millimoles) of crystalline acid novobiocin, 3.47 g. of sodium carbonate, 50 ml. of methyl ethyl ketone, and 6.5 ml. of water were mixed in a 250 ml. flask and heated in a water bath at 50° C. The reaction mixture was stirred for 45 min. at 50° C. and filtered while hot. The filter cake was washed with a solution of 0.65 ml. of water in 5 ml. of methyl ethyl ketone. The filtrate and wash had a combined volume of 62 ml., and this solution (in a 1 l. flask) was heated in a water bath at 50° C. with stirring while 65 ml. of methyl ethyl ketone was added. The resulting turbid solution was seeded with crystals of monosodium novobiocin; and as crystallization proceeded, 130 ml. of methyl ethyl ketone was added at the rate of 10 ml. per min. After thorough mixing, the suspension of crystals was cooled to 20° C. over an interval of 45 min. and then filtered. The crystals were slurried with 60 ml. of methyl ethyl ketone, and the slurry was filtered. The crystals of monosodium novobiocin thus obtained were dried (yield 17.4 g.), and they had an activity of 931 mcg./mg. by U.V. measurement.

*Example 6*

Twenty kg. (31.8 moles) of crystalline acid novobiocin was suspended in 30 l. of methyl ethyl ketone and heated to 48° C. The novobiocin was then converted to monosodium novobiocin by neutralizing with 2945 grams (34.3 moles) of sodium bicarbonate suspended in 10 l. of water. The bicarbonate suspension was added over an interval of 10 min. with stirring, and the vessel was washed with 2 l. of water. The initial reaction was vigorous and the temperature of the reaction mixture dropped to 40° C. The reaction was stimulated intermittently by heating until the temperature reached 50° C. The neutralization was completed in about 30 min. Stirring was continued for 1¼ hrs. with evolution of $CO_2$ gas during the first 15 min. The reaction mixture became clear with only occasional solid particles, and then 54 l. of methyl ethyl ketone was added. The mixture was reheated to 51° C., stirred for 10 min., and then filtered to remove sodium bicarbonate. The filter cake was washed with 12 l. of a solution of 1 l. of water in 11 l. of methyl ethyl ketone. The combined wash and filtrate, totaling 110 l., was divided into two 55 l. portions, and one portion was treated as follows:

Thirty l. of methyl ethyl ketone, that had been heated to 50° C., was added at the rate of 3½ to 4 l. per min. (the temperature of mixture increased to 55° C.). After this addition, a faint turbidity developed, and the solution was seeded with crystals of monosodium novobiocin. Stirring was continued, while crystallization proceeded, until the slurry, after about 15 min., had the consistency of whipped cream. Addition of methyl ethyl ketone, that had been heated to 50° C., was continued at the rate of 4 l. per min. with stirring until the total volume was 348 l. The suspension was cooled to 25° C. and filtered. The filter cake was washed with 10 l. of 98% methyl ethyl ketone (9.8 l. of methyl ethyl ketone and 0.2 l. of water), and the washed crystals were suspended in 31 l. of methyl ethyl ketone. The crystals were recovered on a filter and dried. There was thus obtained 8.38 kg. (83% yield) of monosodium novobiocin having an activity of 907 mcg./mg. when assayed with *S. lutea*.

*Example 7*

Twenty kg. (32.4 moles) of crystalline novobiocin was suspended in 30 l. of methyl ethyl ketone. The suspension was heated to 60° C., and 3 kg. (35.7 moles) of sodium bicarbonate suspended in 15 l. of deionized water was added. As the aqueous bicarbonate was added, the temperature of the reaction mixture decreased to 40° C. The neutralization was extremely vigorous with release of carbon dioxide gas, and agitation had to be stopped until effervescence subsided. The reaction mixture was heated gently to 46° C., and reduced pressure (10″ of water) was applied for 5 min. (until carbon dioxide evolution ceased). The reaction mixture was then diluted with 76 l. of methyl ethyl ketone, and heated to 48° C. It was then filtered, and the filter cake was washed with a sodium consisting of 0.8 l. of water and 8.8 l. of methyl ethyl ketone. The filtrate and washings were combined, and the solution was seeded with 15 g. of crystalline monosodium novobiocin. Crystallization was allowed to proceed for 2½ hrs. at 45° C. This suspension of crystals of monosodium novobiocin was then distilled at a head temperature of 45° to 48° C. under reduced pressure (22″ of water) for 2½ hrs. while a total of 380 l. of methyl ethyl ketone was added to the still as the distillation proceeded. The final total colume of the suspension of crystals was about 120–130 l. The suspension was cooled to 25° C. and filtered. The crystals thus obtained were suspended in 10 gals of acetone and filtered. The filter cake was washed with three 5 gal. portions of acetone, compressed under reduced pressure (23″ of water), and the crystals were dried at about 38° C. for 58 hrs. There was thus obtained 19.5 kg. of crystalline monosodium novobiocin having an activity of 817 mcg./mg. when assayed using *S. lutea*.

We claim:

1. The process which comprises neutralizing novobiocin dispersed in a reaction medium consisting essentially of methyl ethyl ketone and from about 2% to about 40% water to obtain monosodium novobiocin, crystallizing the thus-produced monosodium novobiocin, and recovering the crystalline monosodium novobiocin.

2. The process of claim 1 wherein the crystallization of the monosodium novobiocin is effected by reducing the concentration of water in the reaction medium.

3. The process of claim 2 wherein the concentration of water is reduced by addition of methyl ethyl ketone to the reaction medium.

4. The process of claim 2 wherein the concentration of water is reduced by azeotropic distillation of the reaction mixture.

5. The process which comprises neutralizing novobiocin in a reaction medium consisting essentially of methyl ethyl ketone and from about 2% to about 40% water with a reagent selected from the group consisting of sodium hydroxide and sodium salts of acids having a dissociation constant less than that of novobiocin.

6. The process of claim 5 wherein novobiocin is neutralized at a temperature of about −10° to about 25° C. in a reaction medium containing about 4% water and the reagent is sodium hydroxide.

7. The process of claim 5 wherein the reaction medium contains from about 10% to about 40% water and the reagent is selected from the group consisting of sodium salts of acids having a dissociation constant less than that of novobiocin.

8. The process of claim 7 wherein the reagent is a sodium salt of carbonic acid.

9. The process of crystallizing monosodium novobiocin from a solution of the same in methyl ethyl ketone and from about 10% to about 40% water which comprises reducing the concentration of water.

10. The process of claim 9 wherein the concentration of water is reduced by adding methyl ethyl ketone.

11. The process of claim 9 wherein the concentration of water is reduced by azeotropic distillation of the reaction mixture.

12. The process which comprises neutralizing novobiocin, dispersed in methyl ethyl ketone containing from about 25% to about 40% water with an excess of sodium bicarbonate to produce monosodium novobiocin, adding additional methyl ethyl ketone to the reaction mixture to bring the concentration of methyl ethyl ketone to about 88%, filtering to remove the unreacted sodium bicarbonate, adding methyl ethyl ketone to a concentration of at least about 98% in order to effect crystallization, and recovering the crystalline monosodium novobiocin.

13. The process which comprises neutralizing novobiocin dispersed in methyl ethyl ketone containing about 4% water with one equivalent of sodium hydroxide to produce monosodium novobiocin and recovering crystalline monosodium novobiocin therefrom.

14. In the preparation of crystalline monosodium novobiocin, the improvement which comprises neutralizing novobiocin with a reagent selected from the group consisting of sodium hydroxide, sodium methoxide, sodium ethoxide, sodium carbonate, sodium acetate, sodium propionate, sodium butyrate, sodium 2-ethylhexoate and sodium bicarbonate in a reaction medium consisting essentially of methyl ethyl ketone and from about 2% to about 40% water to produce monosodium novobiocin, and recovering crystalline monosodium novobiocin therefrom.

References Cited in the file of this patent

UNITED STATES PATENTS

| | | |
|---|---|---|
| 2,895,952 | Kaczak | July 21, 1959 |
| 3,049,534 | Wallick | Aug. 14, 1962 |